United States Patent
Brekner et al.

(10) Patent No.: US 6,214,951 B1
(45) Date of Patent: *Apr. 10, 2001

(54) CYCLOOLEFIN COPOLYMERS HAVING HIGH TEAR STRENGTH AND LOW OPTICAL ATTENUATION

(75) Inventors: Michael-Joachim Brekner, Frankurt; Hellmuth Deckers, Ingelheim; Frank Osan, Kelkheim, all of (DE)

(73) Assignee: Hoechst Aktiengesellschaft, Frankfurt am Main (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/844,102

(22) Filed: Apr. 28, 1997

Related U.S. Application Data

(63) Continuation of application No. 08/501,125, filed on Aug. 10, 1995.

(30) Foreign Application Priority Data

Feb. 12, 1993 (DE) .................................................. 43 04 285

(51) Int. Cl.$^7$ .............................. C08F 4/64; C08F 232/08

(52) U.S. Cl. ........................ 526/160; 526/169; 526/169.2; 526/177; 526/185; 526/281; 526/308; 526/348

(58) Field of Search ..................... 526/943, 160, 526/169.2, 281, 308, 348

(56) References Cited

U.S. PATENT DOCUMENTS

| 5,087,677 | 2/1992 | Brekner et al. | 526/160 |
| 5,324,801 | * 6/1994 | Brerner | 526/160 |

FOREIGN PATENT DOCUMENTS

| 9211465A | * 9/1992 | (AU) . |
| 648389B | * 4/1994 | (AU) . |
| 648389 | 4/1994 | (AU) . |
| 2055397 | 5/1992 | (CA) . |
| 41 04 392 | 8/1992 | (DE) . |
| 0 407 870 | 1/1991 | (EP) . |
| 0 485 893 | 5/1992 | (EP) . |
| 0 503 422 | 9/1992 | (EP) . |

* cited by examiner

*Primary Examiner*—Fred Zitomer
(74) *Attorney, Agent, or Firm*—Frommer Lawrence & Haug LLP

(57) ABSTRACT

Thermoplastic cycloolefin copolymers (COCs) having high tear strength and low optical attenuation, a process for their preparation, and their use as optical waveguides (optical fibers).

18 Claims, No Drawings

CYCLOOLEFIN COPOLYMERS HAVING HIGH TEAR STRENGTH AND LOW OPTICAL ATTENUATION

This application is a continuation of application Ser. No. 08/501,125, filed Aug. 10, 1995.

The invention relates to thermoplastic cycloolefin copolymers (COCs) having high tear strength and low optical attenuation, to a process for their preparation, and to their use as optical waveguides (optical fibers).

Optical waveguides are employed for the transport of light, for example for the purpose of illumination or signal transmission. They generally comprise a cylindrical, light-transmitting core surrounded by a cladding layer of a likewise transparent material with a lower refractive index. Thin-film optical waveguides comprise, for example, three transparent layers, where the two outer layers have lower refrfactive index than the central layer. The conduction of light takes place by total reflection at the inteface. Transparent materials which can be employed are glasses or (organic or inorganic) polymers.

The most widespread polymer for use as an optical waveguide, polymethyl methacrylate (PMMA), can only be employed at up to about 85° C. due to its low glass transition temperature of about 106° C. Other known transparent thermoplastics having higher glass transition temperatures, such as, for example, polycarbonate or aromatic polyesters, contain aromatic units in the molecule. These result in increased light absorption in the short-wave spectral region. The use of such polymers for optical waveguides is described in illustrative terms in A. Tanaka et al., SPIE, Vol. 840 (1987).

The heat distortion resistance can be improved by reaction of polymethacrylates. An example which may be mentioned is the polymer-analogous conversion of polymethyl methacrylate into polymethacrylimide. The copolymerization of poly(meth)acrylate with comonomers such as methacrylic anhydride or methacrylonitrile also gives polymers of higher heat resistance than unmodified PMMA. Another route to transparent polymers having increased glass transition temperatures is the use of (meth)acrylates of (per) halogenated or polycyclic aliphatic alcohols or of susbstituted phenols. The latter likewise have increased light absorption in the short-wave spectral region due to the aromatic units. Although the former compounds give transparent polymers having high glass transition temperatures, conversion, for example, into optical fibers is difficult or impossible due to their inherent brittleness.

All the classes of substances described are hygroscopic due to their polar nature. At elevated temperature, the water content in the polymer can cause undesired degradation reactions during conversion, reducing the practical use value.

However, lower water absorption is exhibited by thermoplastic COCs, which also have increased heat distortion resistance. The complete absence of chromophores, such as double bonds of all types, means that these polymers appear particularly suitable for optical applications. It should also be possible to employ these plastics in the area of light conduction (EP-A 0 355 682 and EP-A 0 485 893).

A particularly economical process is described in European Patent Application EP-A 0 485 893, which describes highly reactive metallocenes which polymerize cycloolefins, in particular readily accessible norbornene, to give copolymers having a high glass transition temperature. However, experiments have shown that these copolymers are relatively brittle. Although it is known that the tear strength of a polymeric fiber can be improved by orientation, processability is poor if the polymer becomes brittle immediately below the glass transition temperature, as is the case for the polymers described in EP-A 0 485 893.

COCs can be prepared using specific Ziegler catalysts (EP-A 0 355 682 and EP-A 0 485 893), usually using alkylaluminum or alkylaluminum chlorides as cocatalysts. However, these compounds hydrolyze during the work-up process described to give extremely fine, gelatinous compounds which are difficult to filter. If alkylaluminum chlorides are employed, chlorine-containing compounds, such as hydrochloric acid or salts, which are likewise difficult to separate off, are formed during work-up. If hydrochloric acid is employed for the work-up (EP-A 0 355 682 and EP-A 0 485 893), similar problems arise. In particular in the processing of COCs prepared in this way, a brown coloration occurs. However, in addition to a sufficiently high tear strength, a further important prerequisite for the use of a polymer for the production of a polymeric optical fiber or optical waveguide is excellent transparency.

The object of the invention was to develop a process for the preparation of COCs which are distinguished by improved tear strength, lower optical attenuation, increased glass transition temperature and low water absorption compared with the prior art. A further object was to produce an optical waveguide whose core material comprises this COC.

It has now been found that copolymerization of lower alpha-olefins, cyclic olefins and/or polycyclic olefins using a catalyst system comprising at least one metallocene catalyst and at least one cocatalyst allows the preparation of COCs having a high tear strength of 560–100 mPa, preferably 55–90 mPa, particularly preferably 58–85 mPa, if metallocene catalysts of certain symmetries are employed. (The tear strength increases with increasing molecular weight). If the reaction mixture formed after the copolymerization is subjected to a specific work-up process, optical waveguides having a low optical attenuation of 0.1–5 dB/m, preferably 0.2–2 dB/km and particularly preferably 0.3–1.5 dB/m, can be prepared from the purified COC and a transparent polymer whose refractive index is lower than the refractive index of the COC.

The invention thus relates to a process for the preparation of COCs having high tear strength by polymerization of 0.1 to 99.9% by weight, based on the total amount of the monomers, of at least one monomer of the formula I, II, III or IV

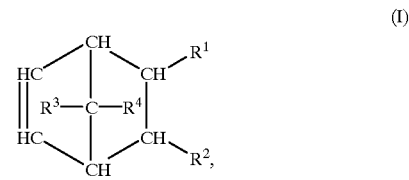

(I)

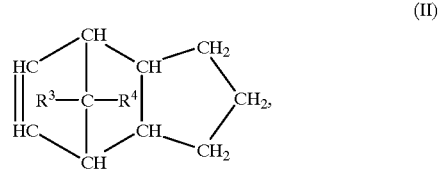

(II)

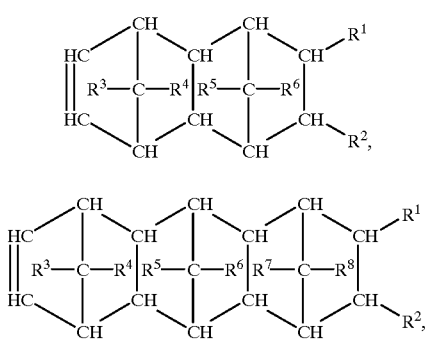

(III)

(IV)

in which $R^1$, $R^2$, $R^3$, $R^4$, $R^5$, $R^6$, $R^7$ and $R^8$ are identical or different and are a hydrogen atom or a $C_1$–$C_8$-alkyl radical or a $C_6$–$C_{16}$-aryl radical, where identical radicals in the various formulae can have different meanings, from 0 to 99.9% by weight, based on the total amount of the monomers, of a cycloolefin of the formula V

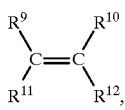

(V)

in which n is a number from 2 to 10, and
from 0.1 to 99.9% by weight, based on the total amount of the monomers, of at least one acyclic 1-olefin of the formula VI (VI)

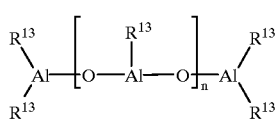

in which $R^9$, $R^{10}$, $R^{11}$ and $R^{12}$ are identical or different and are a hydrogen atom or a $C_1$–$C_8$-alkyl radical or a $C_6$–$C_{16}$-aryl radical, in solution, in suspension, in a liquid cycloolefin monomer, or cycloolefin monomer mixture or in the gas phase, at a temperature of from −78 to 150° C., at a pressure of from 0.5 to 64 bar, in the presence of a catalyst comprising a metallocene as transition-metal component and an aluminoxane of the formula VII (VII)

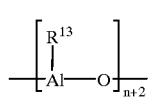

for the linear type and/or of the formula VIII (VIII)

$$\left[\begin{array}{c} R^{13} \\ | \\ Al\,{-}\,O \end{array}\right]_{n+2}$$

for the cyclic type, where, in the formulae VII and VIII, $R^{13}$ is a $C_1$–$C_6$-alkyl group or phenyl or benzyl, and n is an integer from 2 to 50, where the polymerization is carried out in the presence of a catalyst whose transition-metal component is at least one compound of the formula IX (IX)

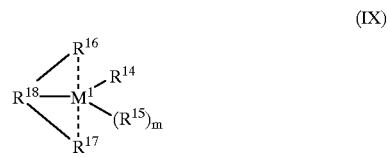

in which $M^1$ is titanium, zirconium, hafnium, vanadium, niobium or tantalum, $R^{14}$ and $R^{15}$ are identical or different and are a hydrogen atom, a halogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group or a $C_8$–$C_{40}$-arylalkenyl group, m may be one or two, depending on the valency of the central atom $M^1$, $R_{18}$ is

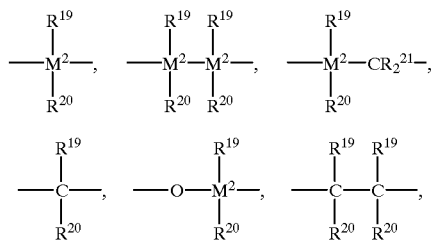

$=BR^{19}$, $=AlR^{19}$, $-Ge-$, $-Sn-$, $-O-$, $-S-$, $=SO$, $=SO_2$, $=NR^{19}$, $=CO$, $=PR^{19}$ or $=P(O)R^{19}$, where $R^{19}$, $R^{20}$ and $R^{21}$ are identical or different and are a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group, or $R^{19}$ and $R^{20}$ or $R^{19}$ and $R^{21}$, in each case with the atoms connecting them, form a ring, $M^2$ is silicon, germanium or tin, $R^{16}$ and $R^{17}$ are identical or different and are a monocyclic or polycyclic hydrocarbon radical which can form a sandwich structure with the central atom $M^1$, wherein the metallocene of the formula IX has $C_2$-symmetry with respect to the ligands $R^{16}$ and $R^{17}$ and with respect to the central atom $M^1$ connecting them in the case where $R^{16}$ and $R^{17}$ are identical and has $C_1$-symmetry in the case where $R^{16}$ and $R^{17}$ are different.

In the polymerization, at least one polycyclic olefin of the formula I, II, III or IV, preferably a cycloolefin of the formula I or III

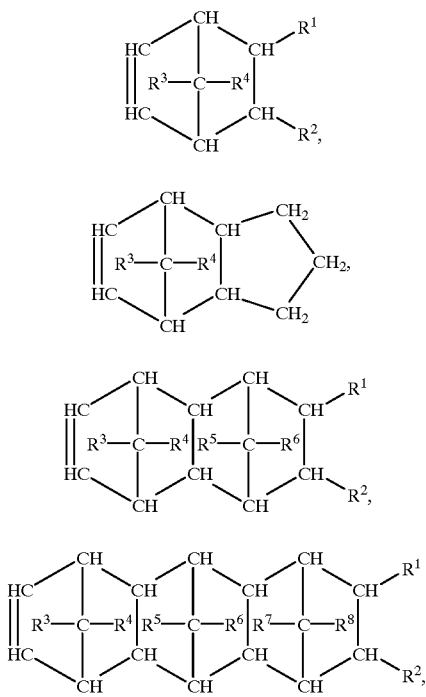

in which $R^1$, $R^2$, $R^3$, $R^4$, $R^5$, $R^6$, $R^7$ and $R^8$ are identical or different and are a hydrogen atom or a $C_1$–$C_8$-alkyl radical or a $C_1$–$C_{16}$-aryl radical, where identical radicals in the various formulae can have different meanings, is polymerized.

It is also possible to use a monocyclic olefin of the formula V

in which n is a number from 2 to 10.

Another comonomer is an acyclic 1-olefin of the formula VI

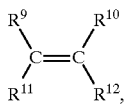

in which $R^9$, $R^{10}$, $R^{11}$ and $R^{12}$ are identical or different and are a hydrogen atom or a $C_1$–$C_8$-alkyl radical, which may also contain a double bond, or a $C_6$–$C_{16}$-aryl radical. Preference is given to ethylene, propylene, butene, hexene, octene or styrene. Particular preference is given to ethene. In addition, it is also possible to employ dienes.

In particular, copolymers of polycyclic olefins of the formula I or II are prepared.

The polycyclic olefin (I to IV) is employed in an amount of from 0.1 to 99.9% by weight, the monocyclic olefin (V) is employed in an amount of from 0 to 99.9% by weight and the acyclic 1-olefin (VI) is employed in an amount of from 0.1 to 99.9% by weight, in each case based on the total amount of the monomers.

The monomers are preferably incorporated in the following ratios:

a) the molar polycyclic olefin (I to IV): 1-olefin (VI) monomer ratio in the corresponding polymers is from 1:99 to 99:1, preferably from 20:80 to 80:20;

b) in polymers comprising polycyclic olefins (I to IV) and monocyclic olefins (V), the molar polycyclic olefin-:monocyclic olefin ratio is from 10:90 to 90:10;

c) in polymers comprising polycyclic olefins (I to IV), monocyclic olefins (V) and 1-olefins (VI), the molar polycyclic olefin:monocyclic olefin:1-olefin monomer ratio is from 93:5:2 to 5:93:2 to 5:5:90, i.e. the molar ratio is within a mixture triangle whose corners are determined by the molar ratios 97:1:2, 5:93:2 and 5:1:94;

d) in a), b) and c), polycyclic olefins, monocyclic olefins and 1-olefins are also taken to mean mixtures of two or more olefins of the particular type.

The catalyst used in the polymerization comprises an aluminoxane and at least one metallocene of the formula IX

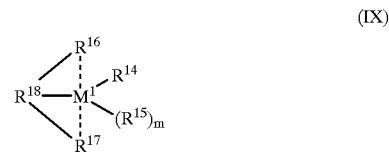

In the formula IX, $M^1$ is a metal from the group comprising titanium, zirconium, hafnium, vanadium, niobium and tantalum, preferably zirconium and hafnium.

$R^{14}$ and $R^{15}$ are identical or different and are a hydrogen atom, a $C_1$–$C_{10}$-, preferably $C_1$–$C_3$-alkyl group, a $C_1$–$C_{10}$-, preferably $C_1$–$C_3$-alkoxy group, a $C_6$–$C_{10}$, preferably $C_6$–$C_8$-aryl group, a $C_6$–$C_{10}$-, preferably $C_6$–$C_8$-aryloxy group, a $C_2$–$C_{10}$-, preferably $C_2$–$C_4$-alkenyl group, a $C_7$–$C_{40}$, preferably $C_7$–$C_{10}$-arylalkyl group, a $C_7$–$C_{40}$-, preferably $C_7$–$C_{12}$-alkylaryl group, a $C_8$–$C_{40}$-, preferably $C_8$–$C_{12}$-arylalkenyl group, or a halogen atom, preferably chlorine, m can be one or two, depending on the valency of the central atom $M^1$, $R^{16}$ and $R^{17}$ are identical or different and are a monocyclic or polycyclic hydrocarbon radical which can form a sandwich structure with the central atom $M^1$.

The metallocene of the formula IX has $C_2$-symmetry with respect to the ligands $R^{16}$ and $R^{17}$ and with respect to the central atom $M^1$ connecting them in the case where $R^{16}$ and $R^{17}$ are identical and has $C_1$-symmetry in the case where $R^{16}$ and $R^{17}$ are different.

$R^{16}$ and $R^{17}$ are preferably indenyl and/or cyclopentadienyl or alkyl- or aryl-substituted indenyl or cyclopentadienyl, $R^{18}$ is a single- or multimembered bridge which links the radicals $R^{16}$ and $R^{17}$ and is

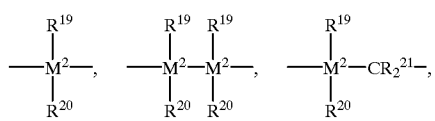

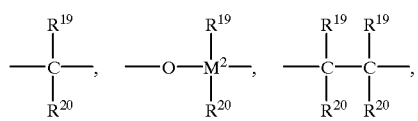

=BR$^{19}$, =AlR$^{19}$, —Ge—, —Sn—, —O—, —S—,
=SO, =SO$_2$, =NR$^{19}$, =CO, =PR$^{19}$ or =P(O)R$^{19}$,
where R$^{19}$, R$^{20}$ and R$^{21}$ are identical or different and are a hydrogen atom, a halogen atom, preferably chlorine, a C$_1$–C$_{10}$- preferably C$_1$–C$_3$-alkyl group, in particular a methyl group, a C$_1$–C$_{10}$-fluoroalkyl group, preferably a CF$_3$ group, a C$_6$–C$_{10}$-fluoroaryl group, preferably a pentafluorophenyl group, a C$_6$–C$_{10}$, preferably C$_6$–C$_8$-aryl group, a C$_1$–C$_{10}$, preferably C$_1$–C$_4$-alkoxy group, in particular a methoxy group, a C$_2$–C$_{10}$, preferably C$_2$–C$_4$-alkenyl group, a C$_7$–C$_{40}$, preferably C$_7$–C$_{10}$-arylalkyl group, a C$_8$–C$_{40}$, preferably C$_8$–C$_{12}$-arylalkenyl group, or a C$_7$–C$_{40}$, preferably C$_7$–C$_{12}$-alkylaryl group, or R$^{19}$ and R$^{20}$ or R$^{19}$ and R$^{21}$, in each case together with the atoms connecting them, form a ring.

M$^2$ is silicon, germanium or tin, preferably silicon or germanium.

M$^{18}$ is preferably =CR$^{19}$R$^{20}$, =SiR$^{19}$R$^{20}$, =Ger$^{19}$R$^{20}$, —O—, —S—, =SO, =PR$^{19}$ or =P(O)R$^{19}$.

The metallocenes can be prepared in accordance with the following reaction scheme:

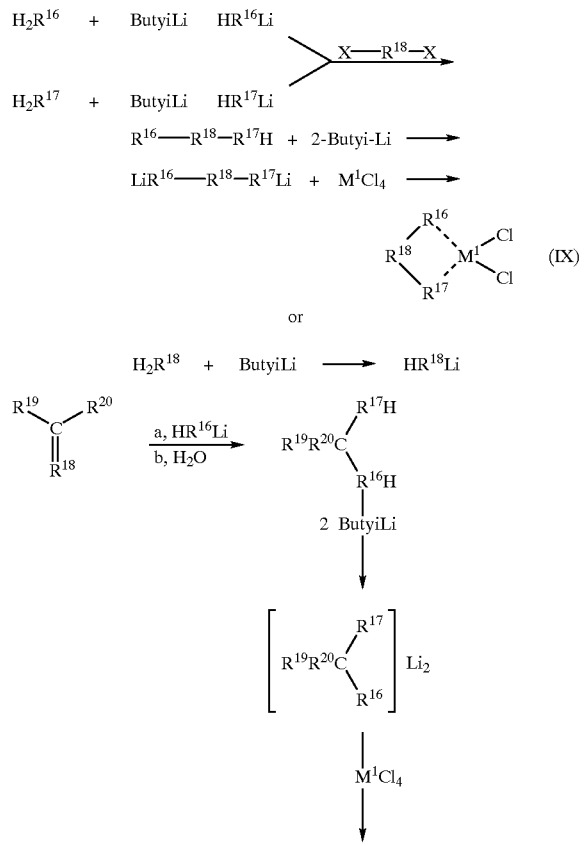

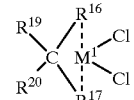

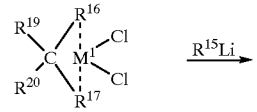 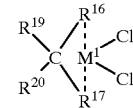

The above reaction scheme naturally also applies to the case where R$^{16}$=R$^{17}$ and/or R$^{19}$=R$^{20}$ and/or R$^{14}$=R$^{15}$.

Preferred metallocenes are:

rac-dimethylsilylbis(1-indenyl)zirconium dichloride,
rac-dimethylgermylbis(1-indenyl)zirconium dichloride,
rac-phenylmethylsilylbis(1-indenyl)zirconium dichloride,
rac-phenylvinylsilylbis(1-indenyl)zirconium dichloride,
1-silacyclobutylbis(1'-indenyl)zirconium dichloride,
rac-ethylenebis(1-indenyl)zirconium dichloride,
rac-diphenylsilylbis(1-indenyl)hafnium dichloride,
rac-phenylmethylsilylbis(1-indenyl)hafnium dichloride,
rac-diphenylsilylbis(1-indenyl)hafnium dichloride,
rac-diphenylsilylbis(1-indenyl)zirconium dichloride,
isopropylene(cyclopentadienyl)(1-indenyl)zirconium dichloride,
isopropylene((3-methyl)cyclopentadienyl)(1-indenyl)zirconium dichloride,
dimethylsilyl(cyclopentadienyl)(1-indenyl)zirconium dichloride, or mixtures thereof.
Dimethylsilylbis(2-methyl-1-indenyl)zirconium dichloride.

Of these, particular preference is given to:

rac-dimethylsilylbis(1-indenyl)zirconium dichloride,
rac-phenylmethylsilylbis(1-indenyl)zirconium dichloride,
rac-phenylvinylsilylbis(1-indenyl)zirconium dichloride,
1-silacyclobutylbis(1'-indenyl)zirconium dichloride,
rac-ethylenebis(1-indenyl)zirconium dichloride,
rac-diphenylsilylbis(1-indenyl)zirconium dichloride,
isopropylene(cyclopentadienyl)(1-indenyl)zirconium dichloride,
isopropylene((3-methyl)cyclopentadienyl)(1-indenyl)zirconium dichloride,
dimethylsilyl(cyclopentadienyl)(1-indenyl)zirconium dichloride, or mixtures thereof.

The cocatalyst is an aluminoxane of the formula VII (VII)

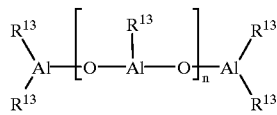

for the linear type and/or of the formula VIII

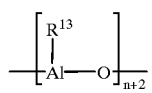
(VIII)

for the cyclic type. In these formulae, $R^{13}$ is a $C_1$–$C_6$-alkyl group, preferably methyl, ethyl, isobutyl, butyl or neopentyl, or phenyl or benzyl. Particular preference is given to methyl. n is an integer from 2 to 50, preferably 5 to 40. However, the precise structure of the aluminoxane is unknown.

The aluminoxane can be prepared in various ways.

In one of the processes, finely powdered copper sulfate pentahydrate is slurried in toluene, and sufficient trialkylaluminum is added in a glass flask under inert gas at about −20° C. so that about 1 mol of $CuSO_4.5H_2O$ is available per 4 Al atoms. After slow hydrolysis with elimination of alkane, the reaction mixture is left at room temperature for from 24 to 48 hours, during which cooling may be necessary so that the temperature does not exceed 30° C. The aluminoxane dissolved in toluene is subsequently separated from the coppe2r sulfate by filtration, and the solution is evaporated in vacuo. It is assumed that this preparation process involves condensation of low-molecular-weight aluminoxanes to give higher oligomers with elimination of trialkylaluminum.

Aluminoxanes are furthermore obtained if trialkylaluminum, preferably trimethylaluminum, dissolved in an inert aliphatic or aromatic solvent, preferably heptane or toluene, is reacted with aluminum salts, preferably aluminum sulfate, containing water of crystallization, at a temperature of from −20 to 100° C. In this reaction, the volume ratio between solvent and the alkylaluminum used is from 1:1 to 50:1, preferably 5:1, and the reaction time, which can be monitored via elimination of the alkane, is from 1 to 200 hours, preferably from 10 to 40 hours.

The aluminum salts containing water of crystallization are in particular those which have a high content of water of crystallization. Particular preference is given to aluminum sulfate hydrate, in particular the compounds $Al_2(SO_4)_3.16H_2O$ and $Al_2(SO_4)_3.18H_2O$ having the particularly high water of crystallization contents of 16 and 18 mol of $H_2O$/mol of $Al_2(SO_4)_3$ respectively.

A further variant of the preparation of aluminoxanes comprises dissolving trialkylaluminum, preferably trimethylaluminum, in the suspending medium, preferably in the liquid monomer, in heptane or toluene, in the polymerization reactor and then reacting the aluminum compound with water.

In addition to the processes outlined above for the preparation of aluminoxanes, there are others which can be used. Irrespective of the preparation method, all aluminoxane solutions have in common a varying content of unreacted trialkylaluminum, in free form or as an adduct. This content has an effect on the catalytic activity which has not yet been explained precisely and varies depending on the metallocene compound employed.

It is possible to preactivate the metallocene by means of an aluminoxane of the formula II and/or III before use in the polymerization reaction. This significantly increases the polymerization activity.

The preactivation of the transition-metal compound is carried out in solution. It is preferred here to dissolve the metallocene in a solution of the aluminoxane in an inert hydrocarbon. Suitable inert hydrocarbons are aliphatic or aromatic hydrocarbons. Preference is given to toluene.

The concentration of the aluminoxane in the solution is in the range from 1% by weight to the saturation limit, preferably from 5 to 30% by weight, in each case based on the entire solution. The metallocene can be employed in the same concentration, but is preferably employed in an amount of from $10^{-4}$ to 1 mol per mol of aluminoxane. The preactivation time is from 5 minutes to 60 hours, preferably from 5 to 60 minutes. The reaction temperature is from −78° C. to 100° C., preferably from 0 to 70° C.

Significantly longer preactivation is possible, but normally neither increases nor reduces the activity, but may be appropriate for storage purposes.

The polymerization is carried out in an inert solvent customary for the Ziegler low-pressure process, for example in an aliphatic or cycloaliphatic hydrocarbon; examples of these which may be mentioned are butane, pentane, hexane, heptane, isooctane, cyclohexane and methylcyclohexane. It is furthermore possible to use a gasoline or hydrogenated diesel oil fraction which has been carefully freed from oxygen, sulfur compounds and moisture. It is also possible to use toluene, decalin and xylene.

Finally, the monomer to be polymerized can also be employed as solvent or suspending medium. In the case of norbornene, bulk polymerizations of this type are carried out at a temperature above 45° C. The molecular weight of the polymer can be regulated in a known manner; hydrogen is preferably used for this purpose.

The polymerization is carried out in a known manner in solution, in suspension, in the liquid cycloolefin monomer or cycloolefin monomer mixture or in the gas phase, continuously or batchwise, in one or more steps, at a temperature of from −78 to 150° C., preferably from −20 to 80° C. The pressure is from 0.5 to 64 bar and is established either by means of the gaseous olefins or with the aid of inert gas.

Particularly advantageous are continuous and multistep processes since they [lacuna] efficient use of the polycyclic process the polycyclic olefin, which feed as residual monomer together with the reaction mixture.

The metallocene compound is used here in a concentration, based on the transition metal, of from $10^{-3}$ to $10^{-7}$ mol, preferably from $10^{-5}$ to $10^{-6}$ mol, of transition metal per $dm^3$ of reactor volume. The aluminoxane is used in a concentration of from $10^{-4}$ to $10^{-1}$ mol, preferably from $10^{-4}$ to $2 \cdot 10^{-2}$ mol, per $dm^3$ of reactor volume, based on the aluminum content. In principle, however, higher concentrations are also possible in order to employ the polymerization properties of various metallocenes.

In the preparation of copolymers, the molar ratios between the polycyclic olefin and the 1-olefin employed can be varied within a broad range. The choice of polymerization temperature, the concentration of the catalyst components and the molar ratio employed allow the incorporation rate of comonomer to be controlled virtually as desired. In the case of norbornene, an incorporation rate of greater than 40 mol % is achieved.

The mean molecular weight of the copolymer formed can be varied in a known manner by varying the catalyst concentration or the temperature.

The polydispersity $M_w/M_n$ of the copolymers is extremely narrow, with values between 1.9 and 3.5. This results in a property profile of the polymers which makes them particularly suitable for extrusion.

The copolymerization of polycyclic olefins with acyclic olefins, in particular with propylene, gives polymers having a viscosity index of greater than 20 $cm^3/g$. Copolymers of norbornene with acyclic olefins, in particular ethylene, have a glass transition temperature of above 100° C.

In order to prepare COCs having a low optical attenuation of 0.1–5 dB/m, the reaction mixture is subjected to purification. Purification is preferably carried out by a process wherein, in a first step, the reaction mixture is suspended with a filtration aid and with a substance which precipitates the organometallic compounds in the reaction mixture, the heterogeneous components are filtered off in a second step, and, in a third step, the purified COC is precipitated from the COC filtrate with the aid of a precipitant or the solvent of the COC filtrate is evaporated off.

In step 3, it is possible to employ evaporation methods such as, for example, evaporation with the aid of a flash chamber, a thin-film evaporator, a ®List compounder (List, England), a vented extruder or a ®Diskpacks (Farrel, USA).

Substances which precipitate the organometallic compound in the reaction mixture are preferably polar compounds, such as water, ethylene glycol, glycerol and acetic acid. The suspending medium is preferably a hydrocarbon. Particularly suitable filtration aids are kieselguhr, for example ®Celite 545 (LuV, Hamburg), Perlite, for example ®Celite Perlite J-100 (LuV), modified cellulose, for example ®Diacel (LuV); porous carbon and absorptive asbestos fibers are also suitable.

The use of filtration aids enables good filtration to be achieved in the filtration step. Continuous or batch filtration techniques can be employed. Filtration can be carried out as a pressure filtration or a centrifugation. The filtration is preferably carried out by means of pressure filters, for example by filtration through a nonwoven material, or by skimmer centrifugation. It is also possible to use other conventional filtration techniques. The filtered COC solution can be fed continuously or batchwise a number of times through the same filter so that the filtration action is further intensified. A suitable precipitant is acetone, isopropanol or methanol.

In order to produce optical waveguides, the resultant polymers, which have been subjected to the above-described purification step and have been dried, are melted using a ram or screw extruder and forced through a die. A cladding layer of a second polymer is applied to the resultant filament, by coextrusion or by coating from a solution, the refractive index of the second polymer being lower than that of the core material. Suitable cladding materials are polymers and copolymers of 4-methylpentene, inter alia olefins, copolymers of ethylene and vinylidene fluoride, with or without addition of other comonomers, such as, for example, hexafluoropropene, tetrafluoroethylene, terpolymers of tetrafluoroethylene, hexafluoropropene and vinylidene fluoride, if desired also ethylene, copolymers of methyl methacrylate and methacrylates of (partially) fluorinated alcohols, for example tetrafluoro-n-propyl methacrylate.

In order to produce flat-film optical waveguides, the polymers purified by the above-described process are melted in an extruder and forced through a flat-film die. The reflection layer on the surface can be applied by coextrusion or by coating from solution with a second polymer whose refractive index is lower than that of the core material.

The invention is described by the examples below.

EXAMPLES

Example 1

A clean and dry 75 dm$^3$ polymerization reactor fitted with stirrer was flushed with nitrogen and then with ethylene and charged with 22,000 g of norbornene melt (Nb) and 6 liters of toluene. The reactor was then heated to a temperature of 70° C. with stirring, and 3.7 bar of ethylene were injected. 500 cm$^3$ of a toluene solution of methylaluminumoxane (10.1% by weight of methylaluminoxane having a molecular weight of 1300 g/mol, according to cryoscopic determination) were then metered into the reactor, and the mixture was stirred at 70° C. for 15 minutes, during which the ethylene pressure was kept topped up at 3.7 bar. In parallel, 1200 mg of rac-dimethylsilylbis(1-indenyl) zirconium dichloride were dissolved in 500 cm$^3$ of a toluene solution of methylaluminoxane (concentration and quality see above) and preactivated by standing for 15 minutes. The solution of the complex (cat. solution) was then metered into the reactor. For molecular weight regulation, 0.4 liter of hydrogen was introduced at the outset. During the polymerization, 500 ml/h of hydrogen were metered in continuously. The mixture was then polymerized at 70° C. for 2.5 hours with stirring (750 revolutions per minute), during which the ethylene pressure was kept topped up at 3.7 bar.

The reaction solution was discharged into a 150 liter stirred reactor containing 500 g of ®Celite 545 (LuV, Hamburg) or alternatively cellulose filtration aid (®Diacel, LuV, Hamburg), 200 ml of water, 0.5 g of peroxide decomposer (®Hostanox SE10, Hoechst) and 0.5 g of antioxidant (®Hostanox 03, Hoechst) in 50 liters of a hydrogenated diesel oil fraction (®Exsol, boiling range 100–120° C., Exxon). The mixture was stirred at 60° C. for 30 minutes.

A filter cake of 500 g of ®Celite (or alternatively 500 g of cellulose), suspended in 10 liters of ®Exsol, was installed on the filter fabric of a 120 liter pressure filter. The polymer solution was filtered through the pressure filter in such a manner that the filtrate was first returned to the filter for 15 minutes. A pressure of up to 2.8 bar of nitrogen was built up above the solution.

The filtrate was then filtered through seven filter cartridges (Fluid Dynamics, Dynalloy XS64, 5 μm, 0.1 m$^2$/cartridge) mounted in a steel housing. The polymer solution was stirred into 500 liters of acetone by means of a disperser (®Ultraturax) and precipitated. During this, the acetone suspension was circulated through a 680 liter stirred pressure filter with opened base valve. The base valve was closed, and the product was washed three times with acetone. 50 g of stabilizer (®Irganox 1010, Ciba) were added to the final wash. After the final filtration, the product was predried at 100° C. in a stream of nitrogen and then dried for 24 hours at 0.2 bar in a drying cabinet. 5070 g of product were obtained. A viscosity index (VI) of 61 cm$^3$ (DIN 51562) and a glass transition temperature ($T_g$) of 179° C. were measured on the product.

Example 2

Comparative Example to Example 1

A clean and dry 75 dm$^3$ polymerization reactor fitted with stirrer was flushed with nitrogen and then with ethylene and charged with 22,000 g of norbornene melt (Nb) and 6 liters of toluene. The reactor was then heated to a temperature of 70° C. with stirring, and 3.7 bar of ethylene were injected. 500 cm$^3$ of a toluene solution of methylaluminumoxane (10.1% by weight of methylaluminoxane having a molecular weight of 1300 g/mol, according to cryoscopic determination) were then metered into the reactor, and the mixture was stirred at 70° C. for 15 minutes, during which the ethylene pressure was kept topped up at 3.7 bar. In parallel, 1200 mg of rac-dimethylsilylbis(1-indenyl) zirconium dichloride were dissolved in 500 cm$^3$ of a toluene solution of methylaluminoxane (concentration and quality see above) and preactivated by standing for 15 minutes. The solution of the complex (cat. solution) was then metered into the reactor. For molecular weight regulation, 0.4 liter of hydrogen was introduced at the outset. During the polymerization, 500 ml/h of hydrogen were metered in continuously. The mixture was then polymerized at 70° C. for 2.5 hours with stirring (750 revolutions per minute), during which the ethylene pressure was kept topped up at 3.7 bar.

The reactor contents were then quickly discharged into a stirred vessel containing 200 cm³ of isopropanol (as stopper). The mixture was precipitated in acetone and stirred for 10 minutes, and the suspended polymer solid was then filtered off. The filtered-off polymer was then added with a mixture of two parts of 3 normal hydrochloric acid and one part of ethanol, and the mixture was stirred for 2 hours. The polymer was then re-filtered, washed with water until neutral and dried at 80° C. and 0.2 bar for 15 hours. 4830 g of product were obtained. A viscosity index VI of 63 cm³ (DIN 51562) and a glass transition temperature ($T_g$) of 178° C. were measured on the product.

Example 3

Comparative Example to Example 1

The process was analogous to Example 1. However, the catalyst used was 350 mg of diphenylcarbyl (cyclopentadienyl) (9-fluorenyl)zirconium dichloride. After a reaction time of 60 minutes, at an ethylene pressure of 3.4 bar and using the work-up process described in Example 1, 4160 g of polymer were obtained, on which a VI of 62 cm³ (DIN 51562) and a $T_g$ of 181° C. were measured.

TABLE 1

|  | COC (Example 1) | COC (Example 3) |
|---|---|---|
| Tear strength/MPa (DIN 53457) | 61 | 39 |

Example 4

The polymer from Example 1 is melted in a ram extruder at a barrel temperature of from 230 to 275° C. and forced at a flow rate of 610 cm³/h through a die having an internal diameter of 2 mm. A terpolymer of tetrafluoroethylene, vinylidene fluoride and hexafluoropropene having a melt flow index of 32 g/10 min at 265° C. and a load of 11 kg is melted in a ram extruder and conveyed at a flow rate of 39 cm³/h to an annular slit arranged concentrically around the core die. The core/cladding fiber produced is cooled in a spinning bath and taken up at a rate of 5.5 m/min. In order to improve the mechanical properties, the fiber is subsequently stretched at 190° C. in a hot-air oven at a ratio of 1:2.5 and then wound up. A core/cladding fiber having a core diameter of 970 μm and a cladding diameter of 1 mm is obtained.

Tear strength 8 cN/tex
Elongation at break 35%
Optical attenuation 1.4 dB/m (650 mm)

Example 5

The polymer from Example 2 is melted in a ram extruder at a barrel temperature of from 230 to 275° C. and forced at a flow rate of 610 cm³/h through a die having an internal diameter of 2 mm. A terpolymer of tetrafluoroethylene, vinylidene fluoride and hexafluoropropene having a melt flow index of 32 g/10 min at 265° C. and a load of 11 kg is melted in a ram extruder and likewise conveyed at a flow rate of 39 cm³/h to an annular slit arranged concentrically around the core die. The core/cladding fiber produced is cooled in a spinning bath and taken up at a rate of 5.5 m/min. In order to improve the mechanical properties, the fiber is subsequently stretched at 190° C. in a hot-air oven at a ratio of 1:2.5 and then wound up. A core/cladding fiber having a core diameter of 970 μm and a cladding diameter of 1 mm is obtained.

Tear strength 7.8 cN/tex
Elongation at break 40%
Optical attenuation 15.8 dB/m (650 mm)

What is claimed is:

1. A process for the preparation of a copolymer of a cycloolefin copolymer (COC) having a low optical attenuation by copolymerization of 0.1 to 99.9% by weight, based on the total amount of the monomers, of at least one monomer of the formula I, II, III or IV

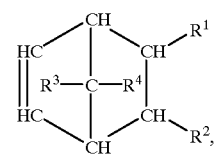

(I)

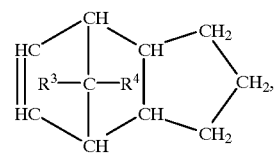

(II)

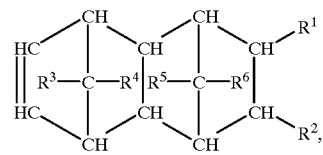

(III)

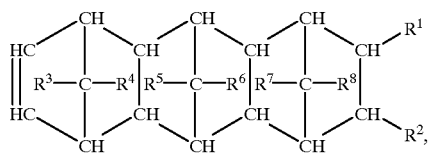

(IV)

in which $R^1$, $R^2$, $R^3$, $R^4$, $R^5$, $R^6$, $R^7$ and $R^8$ are identical or different and are a hydrogen atom or a $C_1$–$C_8$-alkyl radical or a $C_6$–$C_{16}$-aryl radical, where identical radicals in the various formulae can have different meanings, from 0 to 99.9% by weight, based on the total amount of the monomers, of a cycloolefin of the formula V

(V)

in which n is a number from 2 to 10, and
from 0.1 to 99.9% by weight, based on the total amount of the monomers, of at least one acyclic 1-olefin of the formula VI

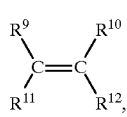

(VI)

in which $R^9$, $R^{10}$, $R^{11}$ and $R^{12}$ are identical or different and are a hydrogen atom or a $C_1$–$C_8$-alkyl radical or a $C_6$–$C_{16}$-aryl radical, in solution, in suspension, in a liquid cycloolefin monomer or cycloolefin monomer mixture or in the gas phase, at a temperature of from −78 to 150° C., at a pressure of from 0.5 to 64 bar, in the presence of a catalyst comprising a metallocene as transition-metal component and an aluminoxane of the formula VII

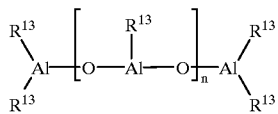

(VII)

for the linear type and/or of the formula VIII

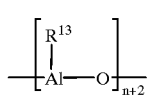

(VIII)

for the cyclic type, where, in the formulae VII and VIII, $R^{13}$ is a $C_1$–$C_6$-alkyl group or phenyl or benzyl, and n is an integer from 2 to 50, where the polymerization is carried out in the presence of a catalyst whose transition-metal component is at least one compound of the formula IX

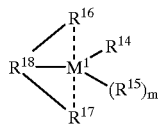

(IX)

in which $M^1$ is titanium, zirconium, hafnium, vanadium, niobium or tantalum, $R^{14}$ and R15 are identical or different and are a hydrogen atom, a halogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group or a $C_8$–$C_{40}$-arylalkenyl group, and m may be one or two, depending on the valency of the central atom $M^1$, $R_{18}$ is $=BR^{19}$, $=AlR^{19}$, —Ge—, —Sn—, —O—, —S—, $=SO$, $=SO_2$, $=NR^{19}$, $=CO$, $=PR^{19}$ or $=P(O)R^{19}$, where $R^{19}$, $R^{20}$ and $R^{21}$ are identical or different and are a hydrogen atom, a halogen atom, a $C_1$–$C_{10}$-alkyl group, a $C_1$–$C_{10}$-fluoroalkyl

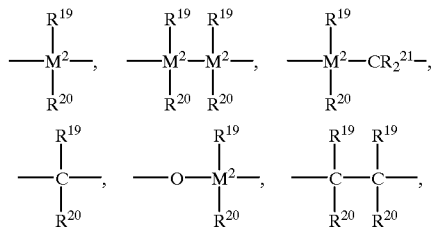

group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group, or $R^{19}$ and $R^{20}$ or $R^{19}$ and $R^{21}$, in each case with the atoms connecting them, form a ring, $M^2$ is silicon, germanium or tin, $R^{16}$ and $R^{17}$ are identical or different and are a monocyclic or polycyclic hydrocarbon radical which can form a sandwich structure with the central atom $M^1$, wherein the metallocene of the formula IX has $C_2$-symmetry with respect to the ligands $R^{16}$ and $R^{17}$ and with respect to the central atom $M^1$ connecting them in the case where $R^{16}$ and $R^{17}$ are identical and has $C_1$-symmetry in the case where $R^{16}$ and $R^{17}$ are different, wherein, when the copolymerization is complete, the copolymer is subjected to a purification process which results in an optimal attenuation of the material from 0.1 to 5 dB/m, and wherein, in a first step of the purification process, the reaction mixture is suspended with a filtration aid and a substance which precipitates the organometallic compounds in the reaction mixture, the heterogeneous components are filtered off in a second step, and, in a third step, the purified COC is precipitated from the COC filtrate with the aid of a precipitant or the solvent of the COC filtrate is evaporated off.

2. The process as claimed in claim 1, wherein the catalyst used is a metallocene of the formula XI in which $R^{16}$ and $R^{17}$ are idenyl and/or cyclopentadienyl.

3. The process as claimed in claim 1, wherein the metallocene used is isopropylene (cyclopentadienyl)-(1-indenyl) zirconium dichloride.

4. The process as claimed in claim 1, wherein the 1-olefin employed is ethylene.

5. The process as claimed in claim 1, that the 1-olefin employed is ethylene and the polycyclic olefin employed is norbornene.

6. A cycloolefin copolymer (COC) prepared by a process as claimed in claim 1, wherein the glass transition temperature of the copolymer is above 100° C.

7. A method of using a COC as claimed in claim 6 for flat and cylindrical optical waveguides.

8. An optical waveguide comprising a light-transmitting core or a light-transmitting layer and a cladding layer of a transparent polymer whose refractive index is lower than the refractive index of the light-transmitting medium, wherein the light-transmitting core or the light-transmitting and/or cladding layer comprises a COC as claimed in claim 6.

9. An optical waveguide as claimed in claim 8, wherein the cladding layer comprises a thermoplastic polymer having a refractive index of from 1.34 to 1.47 (at 589 nm).

10. An optical waveguide as claimed in claim 8, wherein the cladding layer polymers or copolymers are 4-methylpentene and other olefins, copolymers of ethylene and vinylidene fluoride, with or without addition of other comonomers.

11. The process as claimed in claim 1, wherein the purification process results in an optical attenuation of the material from 0.2 to 2 dB/m.

12. The process as claimed in claim 1, wherein the purification process results in an optical attenuation of from 0.3 to 1.5 dB/m.

13. The process as claimed in claim 1, wherein $M^1$ is selected from the group consisting of zirconium and hafnium.

14. The process as claimed in claim 1, wherein $M^1$ is selected from the group consisting of zirconium and hafnium.

15. An optical waveguide as claimed in claim 8, wherein the cladding layer polymers or copolymers comprise olefins.

16. An optical waveguide as claimed in claim 8, wherein the cladding layer polymers or copolymers comprise hexafluoroprotein, tetrafluoroethylene, vinylidene fluoride or mixtures thereof.

17. An optical waveguide as claimed in claim 8, wherein the cladding layer comprises methyl methacrylate, methacrylates of fluorinated or partially fluorinated alcohols or mixtures thereof.

18. An optical waveguide as claimed in claim 8, wherein said cladding layer comprises tetrafluoro-n-propyl methacrylate.

* * * * *